Jan. 24, 1967 P. B. MOORE 3,299,468
MATERIAL TREATING PROCESS AND APPARATUS
Filed July 27, 1964 3 Sheets-Sheet 1

INVENTOR.
PAUL B. MOORE
BY
*Blair & Buckles*
ATTORNEYS

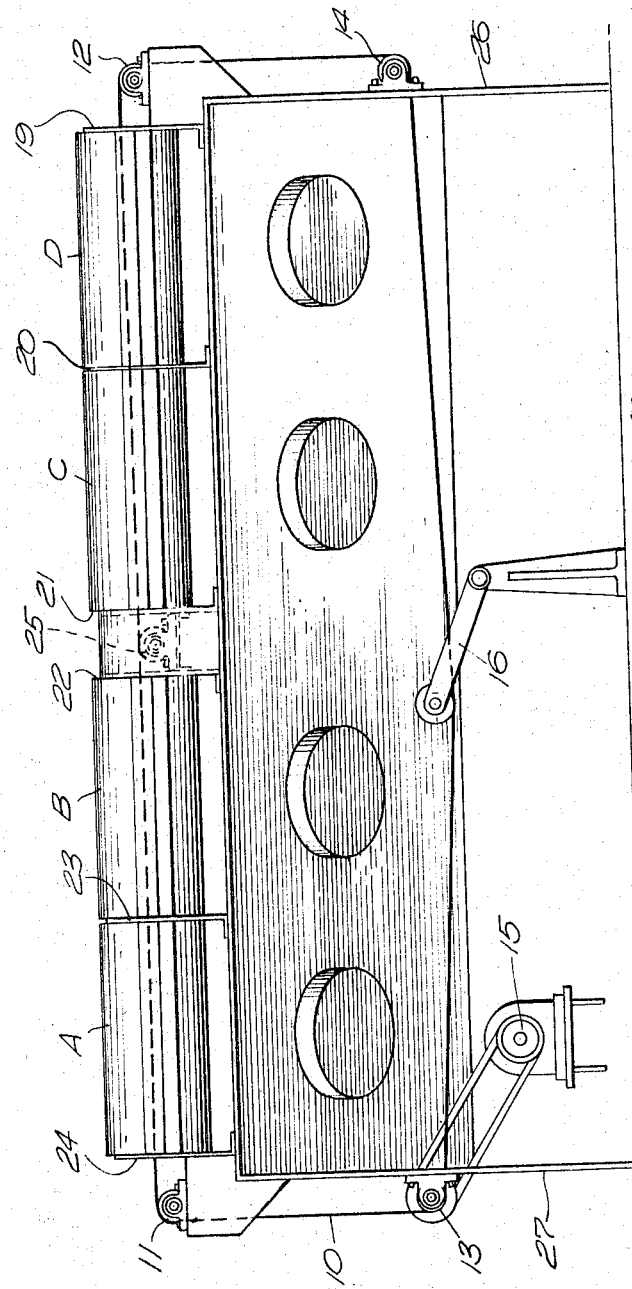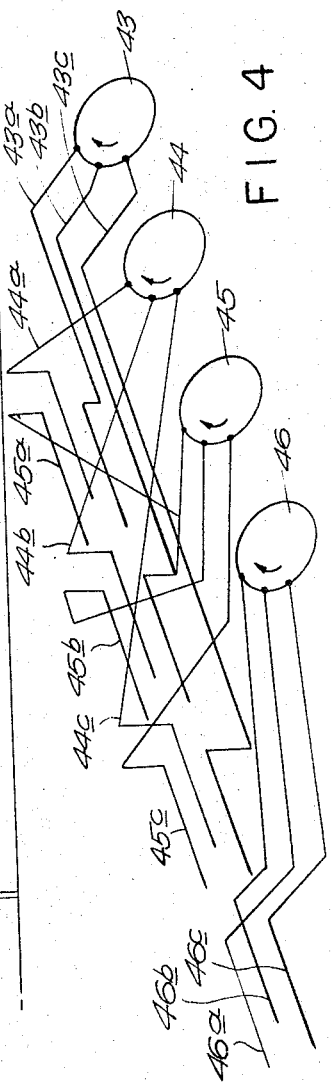

Jan. 24, 1967  P. B. MOORE  3,299,468
MATERIAL TREATING PROCESS AND APPARATUS
Filed July 27, 1964  3 Sheets-Sheet 3

INVENTOR.
PAUL B. MOORE
BY
*Blair & Buckles*
ATTORNEYS 3,299,468
MATERIAL TREATING PROCESS AND
APPARATUS
Paul B. Moore, Wayland, Mass., assignor to Irving B.
Moore Corporation, Cambridge, Mass., a corporation
of Massachusetts
Filed July 27, 1964, Ser. No. 386,113
6 Claims. (Cl. 18—6)

This invention relates generally to the vulcanizing or curing of rubber, and more particularly to new and improved method and apparatus for continuous radiant vulcanizing of rubber.

Vulcanizing or curing as here concerned is the process of heating the rubber to impart to it an optimum degree of physical properties such as hardness, tensile strength, resilience, and resistance to compression or distortion. The vulcanization may be, and under this invention is, accomplished continuously, as the rubber is formed by and discharged from an extruder in a soft, plastic, flowable state.

The prior methods of vulcanizing extruded rubber include hot air vulcanizing, curing in a liquid bath of oil or eutectic salt mixture, and vulcanizing by steam either in a steam autoclave or in a continuous steam vulcanizer.

All of these prior methods have their difficulties and drawbacks. One major limitation of the prior methods is that to accomplish the vulcanizing they rely strictly on, or function solely through, the transfer of heat by conduction.

Another principal shortcoming of the present state of vulcanizing art is that the conventional apparatus is and must be maintained at one temperature throughout the complete curing cycle.

These two drawbacks of conventional vulcanizing practice limit that to a poor result, or cure, characterized by non-uniform dispersal of heat. Thus, and for example, in curing thick sections, either the outer surface must be overcured in order to completely vulcanize the inside, or if the outside is given only a proper cure, the inside must be left undercured. Again, and similarly, when curing shapes with non-uniform dimensions, whereas a good cure may be accomplished on one section of the extrudate, other sections having larger or smaller dimensions will be either under- or over-cured.

There are numerous other difficulties and disadvantages which should be noted in respect to the different conventional vulcanizing methods and apparatus.

In steam vulcanizing the steam which is utilized to heat the work subjects that also to substantial pressure, and special formers are required to maintain the shape of the extrudate, more particularly to prevent distortion of it by the steam pressure. Steam curing is also deleterious to the finish of the extrudate, leaving that blotchy or spotty. Further, the talc which is used in steam curing to support the extrudate and prevent its distortion by steam pressure, and also to prevent the extrudate from sticking to itself when coiled in the autoclave, leaves a deposit on and often causes pits in the surface of the extrudate.

The problem in liquid curing is that the extrudate and particularly the hollow sections tend to float on the surface of the liquid, causing a poor state of cure on the top or top half of the extrudate. On the other hand, if a means is employed to keep the extrudate immersed in the liquid, it tends to collapse hollow sections and stretch and distort intricate shapes.

Another difficulty in liquid curing is that in the liquid baths the oils are flammable and the salts become explosive in temperatures in excess of 500° F., which is a temperature which can be greatly exceeded without injury to the extrudate itself, and with benefit to the vulcanizing process, as hereinafter appearing.

Still further difficulties with the liquid curing are that oil tends to stain white or non-black materials, and that it works into and is impossible to remove completely from sponge, leaving a product of poor quality and objectionable appearance.

The liquid bath also leaves a salt deposit or oil film on the surface of the extrudate, and requires an added process or step of washing the extrudate.

Still further, the leaving by the liquid curing of an oil deposit which cannot be completely removed renders it difficult or impossible to bond or cement the rubber to metal or other substrates, in that the oil film does not allow for proper adhesion of the rubber.

Considering now steam vulcanizing, this method may be made continuous, but for that an extremely long and cumbersome and very expensive unit of 50 to 200 feet or more in length is required.

The different but equally serious problem of steam autoclaving is that the process is not continuous and calls for much extra handling of the extrudate, which must typically be coiled on reels or trays, then loaded into the autoclave, then vulcanized, then unloaded from the autoclave, then finally recoiled for shipment. Further, the length of the extrudate and the volume of production is restricted to the size and output capacity of the autoclave.

All of the foregoing difficulties and disadvantages of conventional methods and apparatus are either eliminated or overcome by this invention.

The general purpose of this invention is to provide safer, cleaner, more economical, and generally improved method and apparatus for continuously vulcanizing extruded natural and synthetic rubber and the like elastomeric materials.

The general object of this invention is more particularly to provide an elastomeric material or rubber curing or vulcanizing method and apparatus which is free from all of the foregoing difficulties and disadvantages of the prior or conventional vulcanizing methods and apparatus.

Another invention object is to provide a vulcanizing method which is particularly suited or beneficial to the curing of tubing or other hollow shapes, and of extrusions which have a non-uniform cross sectional configuration.

A further invention object is to provide an improved vulcanizing method which is particularly suited or beneficial to the curing of difficult materials and surfaces, and particularly sponge and non-black extrusions.

Yet another invention object is to provide novel vulcanizing method and means for uniform dispersal of heat to the insides and outsides of and to the non-uniform sections of the extrudate, in that avoiding undercure of larger sections or interior portions without overcure of thinner sections or outer portions of the extrudate.

Still another invention object is to provide for uniform controlled heating of the extrudate through accomplishing the transfer of heat to it by radiation, and also by convection.

A further invention object is to provide an improved apparatus for vulcanizing rubber by radiation and convection heat transfer and employing for that purpose infra red lamps in conjunction with a transparent quartz tube which has optical properties advantageous to the transmission of infra-red rays.

Yet another invention object is to provide an improved method by which the vulcanizing of rubber may be carried out more rapidly than heretofore.

Still another invention object is to provide method and means for vulcanizing rubber extrudate under control and adjustment of the heating temperature of the extrudate, with capability for such control and adjustment locally or independently at different sections, and with the sections taken or considered both longitudinally and radially of the extrudate.

A further invention object is the vulcanizing of the rubber without distorting it, without subjecting it to pressure, without the use of formers, without the necessity of depressing it in liquid, and without any tendency of collapsing or stretching the extrudate.

A still further invention object is the control and adjustment of the speed of delivery or advance of the continuous extrudate, with capacity for adjusting or varying the speed to eliminate stretch and to enable the attaining or maintenance of closer tolerances on the extrudate dimensions.

Another important invention object is the carrying out of the vulcanizing with safety, and at temperatures ranging up to 1,000° F., with no risk of combustion or explosion.

A still further invention object is the achieving of significant economies in the vulcanizing, through provision of a compact unit which may be only about 10 ft. long, and through use of a continuous method.

Another invention object is the carrying out of vulcanizing in a shorter time, through provision of an apparatus which can be brought to operating temperature far more rapidly than heretofore, and the operating temperature of which is far higher than before.

Yet another invention object is to provide a means of vulcanizing without adverse effect to the surface finish of the extrudate, and so as to produce an extrudate with a smooth clean surface which is free of pits and talc or oil deposit.

The invention will be understood from the following description taken in conjunction with the accompanying drawings in which:

FIG. 3 is a longitudinal side view of the apparatus;

FIG. 4 shows the control circuits of the apparatus; and

Figure 1:
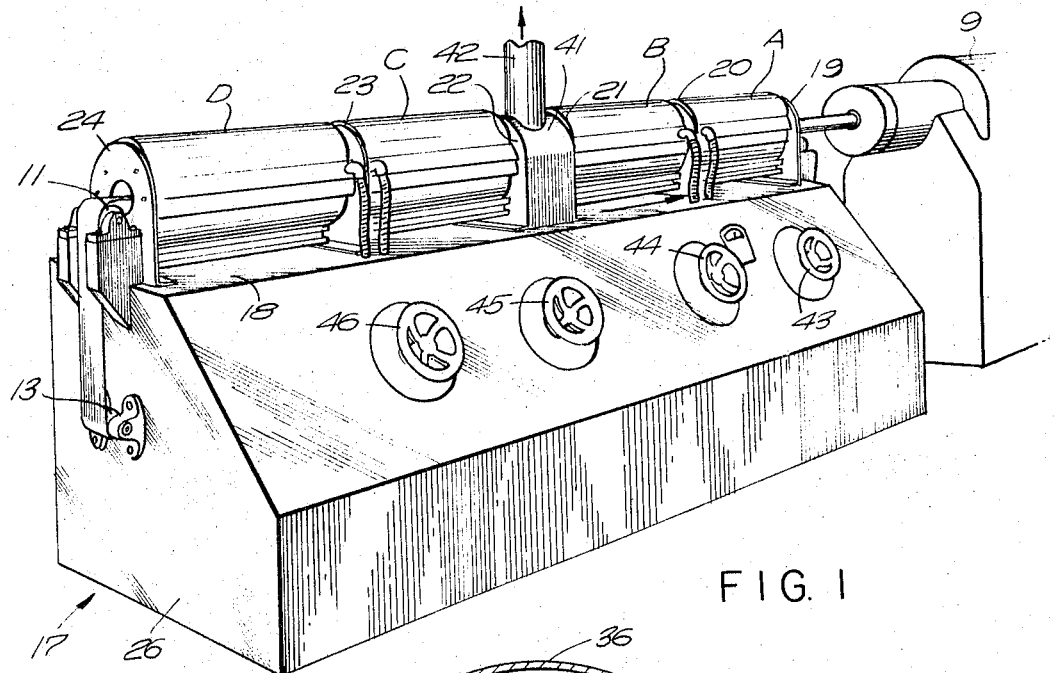
FIG. 1 is an assembly view in perspective of a preferred embodiment of the invention apparatus.

In the form herein illustrated the curing apparatus of my invention comprises an endless web or belt 10 of porous mesh fiberglass or other radiant energy transmitting construction carried on pulleys 11, 12, 13, 14 and providing an elongated straight support on which the extrudate is carried or advanced through the curing apparatus directly from the extruder 9, FIG. 1. The belt 10 is rotated or advanced by any suitable motor 15 having driving engagement with any one or more of the pulleys 11, 12, 13, 14. A biasing means 16 of desired type or form may also be provided to maintain desired tension on the belt.

The aforementioned conveyor elements, and also the heating units hereinafter to be mentioned, may be supported at extruder height on a suitable carriage or housing 17 having a top plate 18 above which the belt 10 is elevated by the upper pulleys 11, 12, and which mounts also a series of up-standing plates or brackets 19, 20, 21, 22, 23, 24 which are centrally apertured, FIG. 5, to receive the upper belt run and to support other parts, as hereinafter mentioned. In units of a length sufficient to require that, a support or idler pulley 25 may be provided for the belt 11 intermediate the ends of its upper, extrudate supporting run, as herein by mounting on plate 18 between the intermediate pair of brackets, 21, 22.

The housing 17 also has end walls 26, 27 on which the lower run pulleys 13, 14 and also the motor 15 may be mounted, and also longitudinal side panels as shown to completely enclose the apparatus elements contained therewithin, and to mount therethrough the temperature control units as later described.

Figure 2:
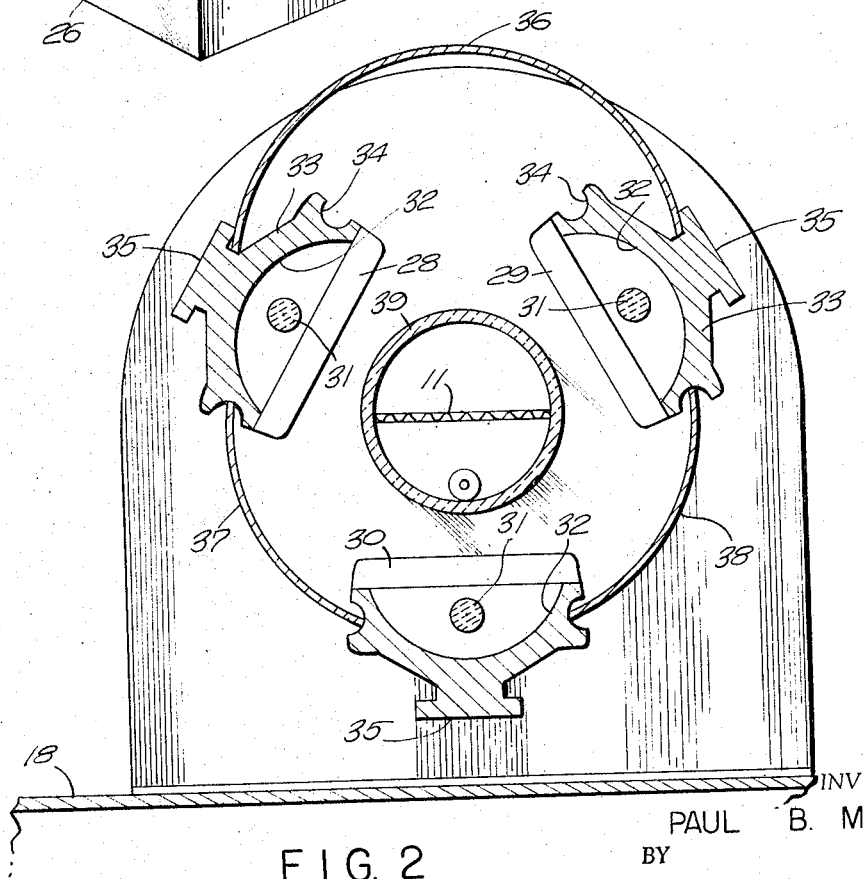
FIG. 2 is a vertical section of the apparatus taken along the line 2—2 of FIG. 1.

In accordance with the invention, means are provided for combined radiant and convection energy heating of the extrudate, herein by a series of lamps 28, 29, 30, FIG. 2, uniformly or equidistantly disposed or arranged around, or circumferentially of, the extrudate, as it passes through the apparatus on the belt 11. The lamp series 28, 29, 30 is provided in each section of the apparatus, the embodiment herein illustrated having the four sections A, B, C, D, and therefore four series of three, or, in all, twelve lamps. The lamps or radiant heaters 28, 29, 30 are of a high intensity type and comprise each a radiant energy source in the form of a quartz tube 31 having porcelain or other insulating mounting at the focus of a parabolic aluminum housing or reflector 32, whereby the source tube output is uniform and directed in linear parallel rays at the extrudate, from which the lamps may be spaced, say, three or four inches. The output of the heaters 28, 29, 30 is infra red radiation of high intensity. For example they may each produce 100 watts output per linear inch of extrudate length, and a capacity of 1600 watts.

In one commercially available heating unit the lamp reflector 32 is mounted on a backing or yoke structure 33 which is formed at its opposite extremities with longitudinal recesses or notches 34, and which depends centrally also from a basal flange or channel element 35, FIG. 2. The radiant heaters 28, 29, 30 are thus mounted in the invention apparatus by removably fastening or securing the yoke structures 33, at their opposite ends, to and between the brackets 19–20, 20–21, 22–23, and 23–24, as shown, FIGS. 1, 3, 5.

In accordance with the invention each of the sections A, B, C, D, is enclosed between the lamps 28, 29, 30 by resilient metal panels or sheets 36, 37, 38, FIG. 2, which sheets are confined between or seated in the terminal notches 34 or variously in the recesses defined between the yokes 33 and the basal flanges 35. The releasably engaged spring seated plates 36, 37, 38 are seen from FIG. 2 to define a generally annular enclosure for the belt 11 and the extrudate supported thereon through the curing apparatus, and will be understood to stabilize the atmosphere to which the extrudate is subject, and as well to shield the operator from the intense heat and light of the radiant energy sources.

Further in accordance with the invention, means are provided for diffusing or refracting the radiant energy so as to uniformly distribute that about the periphery of the extrudate, and thereby to assure the uniform, distortion free heating or curing of the same. The heat ray diffusing or refracting means is herein embodied as a radiant energy transmitting quartz glass tube mounted or supported through the central apertures in the upright brackets 19–24, and so as to surround or enclose the upper, extrudate supporting run of the belt 10 between the pulleys 11, 12 and as that intersects the radiant rays of the lamps 28, 29, 30 in the sections A, B, C, D, of the vulcanizing apparatus, whereby the tube will serve to distribute the heat energy of the radiant sources in a manner to render that uniform as applied to the extrudate.

The quartz tube also has the function to carry off the combustible gases and films which the extrudate will release at certain curing temperatures, and which would otherwise discolor the heater reflectors. In a single tube unit this would be accomplished simply by the tube confining and conducting the gases for escape or exit out its opposite ends, or away from the heating units.

Figure 5:
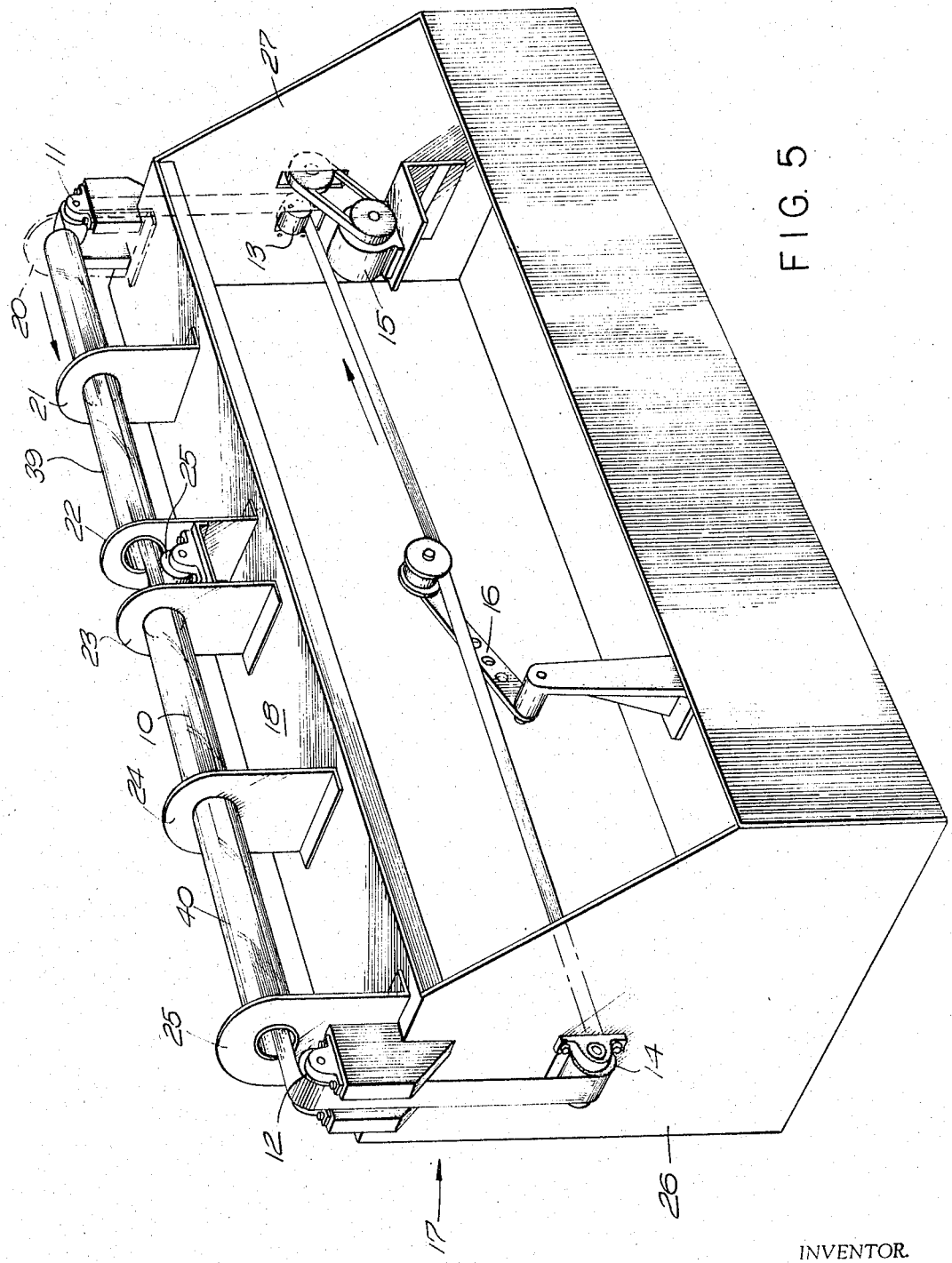
FIG. 5 is a perspective view of the apparatus with parts removed to show the arrangement of the extrudate supporting web.

In the present embodiment of the apparatus the heat ray diffusing or refracting means comprises a two length quartz tube 39, 40, the tube having its one length 39 carried through the brackets 19–21, and the other length 40 supported through the brackets 22–24 as shown in FIGS. 1 and 5. The space between the brackets 21, 22 and the proximate ends of the tube lengths 39, 40 is closed by a housing 41 overlying the plate 18 and spanning between the brackets 21, 22 so as sealingly to enclose the belt 10, and extrudate as also extending therebetween. The housing 41 opens upwardly to a chimney 42 extending upwardly therefrom, and which may be coupled to a source of vacuum or suction, which may comprise a flexible overhead conduit provided with an evacuating blower or fan. Upon operation of the suction blower then, the gases that may be emitted from the extrudate within the heated tube lengths are forced out through the chimney 42, and are replaced normal atmosphere drawn inwardly from the open distant ends of the tube lengths 39, 40.

The multiple, herein triple series of lamps 28, 29, 30 in each of the sections A, B, C, D, of the curing apparatus are operated from control units 43, 44, 45, 46, FIG. 1, which control units have connections 43, *a*, *b*, *c*, 44, *a*, *b*, *c*, 45, *a*, *b*, *c*, 46, *a*, *b*, *c*, FIG. 4, which are coupled to the heating units as shown whereby the corresponding heating units of each of the sections A, B, C, D are controlled from one of the corresponding control units 43, 44, 45, 46 and whereby the plurality of heating units of the last or trailing section D are together controlled from the remaining or corresponding control unit 46.

The invention apparatus can be energized and brought up to operating temperature in about five minutes as contrasted with the one and one half hours start up or warm-up time required for the conventional hot oil bath. The apparatus is controlled to heat the extrudate to the desired temperatures, which may be, say, 600° F., or a temperature higher than and without limit to the temperature at which the oils used in liquid curing are combustible and the molten salts thereof are explosive.

Further, with the focused radiant energy and also the heating by convection, the intense controlled heat can be dispersed into the extrudate material much faster than with the liquid bath without burning, whereby the same cure may be accomplished with a shorter unit or a faster delivery rate.

It will also be appreciated that the apparatus may be differently operated either to initially shock the extrudate with very high temperatures, to set up a partial or skin cure followed by tapering down to a fast cure, or to establish lower temperatures at the beginning of the apparatus followed by gradual elevating of the temperatures so as to come to the final cure at the end of or at any intermediate point in the length of the apparatus.

The control of the cure involves first the speed of the extrudate advance by the belt 11, together with the intensity or wattage of the lamps 28, 29, 30, which, as above shown, can be regulated to afford even or uniform curing of a much greater variety of wall thicknesses and solid and hollow shapes than theretofore. Also as pointed out earlier, the invention heater can be set up for individual control of a unit length, as herein at 46, or alternatively for parallel control of corresponding radial segments of one or more of said unit lengths, as herein at 43, 44, 45. In this way the invention apparatus can be made to uniformly cure extrusions of non-uniform section, and can be flexibly set up or adjusted to obtain adequate cure without over cure, and to forestall overcure without resulting undercure.

Those skilled in the art will appreciate that with this invention great economies may be realized in the operation of the curing apparatus, the operating cost for the embodiment herein shown and described being on the order of $2 an hour as against $4 an hour for the conventional oil bath equipment.

It will be appreciated still further that with this invention the curing process is afforded a far higher capacity of heat treatment. For particular example, with a ⅜″ diameter solid traveling at 15 feet per minute only 60% of the input of the illustrated embodiment is required to maintain the curing temperature of 550° F.

From the foregoing it will be seen that under the invention the extrudate is not required to be subjected to pressure, or immersed in liquid such as oil or salts. However, a cold water bath may be employed as an additional feature of control and flexibility, to stop the cure, following exit of the extrudate from the radiant heater.

In any case, with the control and adjustment which the invention method and apparatus affords, and even in complex shapes, the extrudate may be kept to within the closest, say a few thousandths of an inch, tolerance of which the extruder is capable.

From the foregoing it will also be apparent that under the invention no distorting, collapsing, forming, or deleterious coating or exposure of the extrudate is required, and with the result that hereunder there is had not only uniform curing of different and difficult extrusions, but also the non-distorting handling of them and with that the preserving to the extrudate of a superior and unblemished texture and surface.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

I claim:

1. Apparatus for continuous thermal curing of rubber extrudate directly as that is discharged by the extruder, comprising a smooth, radiant-heat-transmitting belt arranged to carry the extrudate from the extruder in a path of desired length and direction, means for driving the belt to advance the extrudate at a desired rate controlled in relation to the rate of extruder delivery, a plurality of at least three infra red heaters substantially equidistantly distributed circumferentially around the belt, said heaters constructed and arranged to disperse curing heat into said extrudate rapidly but without burning the extrudate and comprising each a radiant source tube paralleling said belt and extrudate, and an elongated parabolic reflector oriented towards the extrudate and arranged with the tube at its focus whereby substantially all of the heat of the tube is directed in parallel rays at the extrudate, means for individually controlling the heaters for even distortion-free curing of the extrudate whether of round or non-round configuration, a gas-tight radiant transmitting tube enclosing said belt and extrudate between them and said heaters, said tube of quartz glass material passing infra red frequencies and refracting and diffusing said infra red rays to define and integrate said sources as a circumferentially continuous and uniform heat medium, and said tube serving also to carry out the fumes and gases from the extrudate and thereby to exclude them from contact with said heaters.

2. The apparatus of claim 1 wherein said belt is of porous fibreglass construction.

3. The apparatus of claim 1 and means communicating with said tube and operable to expel from it the fumes and gases given off by the extrudate in the curing and in that to exclude said fumes and gases from contacting said heat sources.

4. The apparatus of claim 1 and opaque shields spanning between said heat sources, said shields protecting the apparatus from the heat and light of said sources and also confining and stabilizing the environmental atmosphere of said tube.

5. The apparatus of claim 1 wherein said heater controlling means are operable to determine the time and temperature of the curing cycle and to program the temperature at the same or different levels through said cycle.

6. The apparatus of claim 1 wherein a plurality of similar heater sets are similarly arranged longitudinally of the conveyor and extrudate, and wherein the heater control means are arranged and connected to correspondingly regulate the corresponding heaters of said sets whereby to afford heat adjustment to compensate for non-uniform cross-sectional configuration of said extrudate and also for any radiant heat absorption by said conveyor means.

References Cited by the Examiner

UNITED STATES PATENTS

| | | | |
|---|---|---|---|
| 1,999,751 | 4/1935 | Clayton | 18—6 |
| 2,565,003 | 8/1951 | Simorda | 18—6 |
| 2,827,505 | 3/1958 | Farrell | 264—25 |
| 2,948,020 | 8/1960 | D'Ascoli | 264—25 |
| 3,085,287 | 4/1963 | Wach | 18—6 |
| 3,121,912 | 2/1964 | Dieckmann | 18—6 |

FOREIGN PATENTS

| | | |
|---|---|---|
| 1,080,987 | 12/1954 | France. |
| 592,583 | 9/1947 | Great Britain. |
| 1,534,129 | 2/1954 | Sweden. |

W. F. STEPHENSON, *Primary Examiner.*